United States Patent
Nesti et al.

(10) Patent No.: US 11,105,408 B2
(45) Date of Patent: Aug. 31, 2021

(54) CONTINUOUSLY VARIABLE TRANSMISSION DEVICE WITH DEVICE FOR VARYING THE TRANSMISSION CURVE

(71) Applicant: PIAGGIO & C. S.p.A., Pisa (IT)

(72) Inventors: Paolo Nesti, Pisa (IT); Walter Mariotti, Pisa (IT); Giacomo Freschi, Pisa (IT)

(73) Assignee: PIAGGIO & C. S.P.A., Pontedera (IT)

( * ) Notice: Subject to any disclaimer, the term of this patent is extended or adjusted under 35 U.S.C. 154(b) by 363 days.

(21) Appl. No.: 16/334,454

(22) PCT Filed: Sep. 19, 2017

(86) PCT No.: PCT/IB2017/055668
§ 371 (c)(1),
(2) Date: Mar. 19, 2019

(87) PCT Pub. No.: WO2018/055514
PCT Pub. Date: Mar. 29, 2018

(65) Prior Publication Data
US 2021/0190195 A1    Jun. 24, 2021

(30) Foreign Application Priority Data
Sep. 21, 2016 (IT) .......................... 102016000094759

(51) Int. Cl.
*F16H 55/56* (2006.01)
*F16H 9/12* (2006.01)
(52) U.S. Cl.
CPC .......... *F16H 55/563* (2013.01); *F16H 9/125* (2013.01)

(58) Field of Classification Search
CPC ...... F16H 55/563; F16H 55/56; F16H 63/067; F16H 61/66245; F16H 9/18
(Continued)

(56) References Cited

U.S. PATENT DOCUMENTS 3,161,071 A * 12/1964 Getz ........................ F16H 55/56
474/19
3,608,386 A *  9/1971 Pambid ................. F16H 61/662
474/37

(Continued)

FOREIGN PATENT DOCUMENTS

| DE | 3830165 A1 | 3/1989 |
| JP | 2008185056 A | 8/2008 |

OTHER PUBLICATIONS

International Search Report for corresponding application PCT/IB2017/055668 filed Sep. 19, 2017; dated Jan. 10, 2018.

*Primary Examiner* — Henry Y Liu
(74) *Attorney, Agent, or Firm* — Cantor Colburn LLP

(57) ABSTRACT

A CVT transmission device (1) comprises a drive pulley (4) provided with a mobile bushing (9), a fixed bushing (11), a cam system (95,111; 97,113) comprising at least one driven cam portion (95) of mobile bushing (9) and a cam portion (111) of the fixed bushing (11). The mobile bushing (9) comprises a main wall (91) annular with respect to the axis of rotation (X), having an inner surface (91*a*) which delimits a housing compartment (91*c*) and said driven cam portion (95) protrudes radially internally from said inner surface (91*a*). The drive cam portion (111) of the fixed bushing (11) is suitable to penetrate axially in said housing compartment of the mobile bushing (9).

4 Claims, 4 Drawing Sheets

(58) Field of Classification Search
USPC .............................................. 474/13, 14, 15
See application file for complete search history.

(56) References Cited

U.S. PATENT DOCUMENTS

| | | | | |
|---|---|---|---|---|
| 3,616,706 | A * | 11/1971 | Shimamoto | F16H 55/56 474/19 |
| 3,625,079 | A * | 12/1971 | Hoff | F16H 61/66227 474/12 |
| 3,685,366 | A * | 8/1972 | Schupan | F16H 55/563 474/13 |
| 3,709,052 | A * | 1/1973 | Lassanske | F16H 55/563 474/13 |
| 3,722,308 | A * | 3/1973 | Steuer | F16H 55/56 474/19 |
| 3,800,608 | A * | 4/1974 | Bessette | F16H 55/563 474/14 |
| 3,861,229 | A * | 1/1975 | Domaas | F16H 61/66245 474/14 |
| 3,908,475 | A * | 9/1975 | Takagi | F16H 61/66227 474/12 |
| 3,939,720 | A * | 2/1976 | Aaen | F16H 55/563 474/14 |
| 3,996,811 | A * | 12/1976 | Reese | F16H 55/563 474/12 |
| 4,094,204 | A * | 6/1978 | Yamamoto | F16H 61/66245 474/14 |
| 4,345,664 | A * | 8/1982 | Anno | F16H 61/66245 180/230 |
| 4,348,197 | A * | 9/1982 | Oliver | F16H 61/6625 474/17 |
| 4,364,735 | A * | 12/1982 | Plamper | F16H 55/563 474/13 |
| 5,108,347 | A * | 4/1992 | Gourdon | F16H 55/563 474/13 |
| 5,254,041 | A * | 10/1993 | Duclo | F16H 55/563 474/14 |
| 5,328,413 | A * | 7/1994 | Robert | F16H 55/563 474/13 |
| 5,358,450 | A * | 10/1994 | Robert | F16H 55/563 474/13 |
| 5,421,784 | A * | 6/1995 | Robert | F16H 55/563 474/13 |
| 5,562,555 | A * | 10/1996 | Peterson | F16H 55/563 192/105 CD |
| 6,033,329 | A * | 3/2000 | Erlandson | F16H 55/56 474/14 |
| 6,277,043 | B1 * | 8/2001 | Friedmann | F16H 55/56 474/18 |
| 6,520,878 | B1 * | 2/2003 | Leclair | F16H 55/563 474/12 |
| 6,743,129 | B1 * | 6/2004 | Younggren | F16H 55/56 474/17 |
| 6,958,024 | B2 * | 10/2005 | Takano | F16H 55/563 474/12 |
| 7,172,523 | B2 * | 2/2007 | Borghi | F16H 55/563 192/3.54 |
| RE41,424 | E * | 7/2010 | Benson | F16H 63/067 474/10 |
| 7,803,074 | B2 * | 9/2010 | Ishida | F16H 63/067 474/8 |
| 7,892,121 | B2 * | 2/2011 | Oishi | F16H 55/563 474/17 |
| 8,496,551 | B2 * | 7/2013 | Mueller | F16H 63/067 474/17 |
| 8,894,520 | B2 * | 11/2014 | Labbe | F16H 63/067 474/19 |
| 9,228,644 | B2 * | 1/2016 | Tsukamoto | F16H 55/563 |
| 9,518,641 | B2 * | 12/2016 | Mariotti | F16H 61/66245 |
| 9,933,064 | B2 * | 4/2018 | Aitcin | F16H 9/18 |
| 10,865,860 | B2 * | 12/2020 | Mariotti | F16H 55/563 |
| 2002/0119846 | A1 * | 8/2002 | Kitai | F16H 55/56 474/14 |
| 2002/0123400 | A1 * | 9/2002 | Younggren | F16H 63/067 474/14 |
| 2004/0063524 | A1 * | 4/2004 | Zulawski | F16H 55/56 474/19 |
| 2004/0229724 | A1 * | 11/2004 | Kalies | F16H 55/56 474/19 |
| 2006/0258492 | A1 * | 11/2006 | Wu | F16H 55/563 474/13 |
| 2006/0264279 | A1 * | 11/2006 | Starkey | F16H 63/062 474/18 |
| 2014/0235382 | A1 * | 8/2014 | Tsukamoto | F16H 63/067 474/14 |
| 2014/0315670 | A1 * | 10/2014 | Mariotti | F16H 9/12 474/12 |
| 2015/0111674 | A1 * | 4/2015 | Yuan | F16H 9/12 474/14 |
| 2015/0267792 | A1 * | 9/2015 | Hochmayr | F16H 63/065 474/14 |
| 2017/0030454 | A1 * | 2/2017 | Aitcin | F16H 55/563 |
| 2018/0355967 | A1 * | 12/2018 | Mariotti | F16H 55/563 |

* cited by examiner

Range of action of the classic CVT system

Range of action of the CVT system with cam on the front group

CONTINUOUSLY VARIABLE TRANSMISSION DEVICE WITH DEVICE FOR VARYING THE TRANSMISSION CURVE

The present invention relates to a transmission system, in particular a transmission system of the continuously variable type for motorcycles, provided with a device for varying the transmission curve.

In the present document, the term "motorcycles" means a two, three or four wheeled vehicle, tilting or non-tilting, such as the Vespa®, Ape® or MP3® vehicles marketed by the Applicant.

The continuously variable transmission with expandable pulley and V-belt (or CVT) is an automatic transmission for vehicles wherein the transmission ratio may vary continuously between two limit values. The continuously variable transmission is widely used in small and medium-sized two-wheeled vehicles, in particular motor scooters.

In a conventional CVT, the transmission ratio is varied by varying the winding diameters of the belt on two pulleys, of which one drives and the other is driven, and at least one of the pulleys has the ability to move the two parts or half-pulleys composing it closer together or farther apart.

Typically, the drive pulley comprises a speed controller made of centrifugal masses, generally referred to as "rollers", that have the object of accomplishing the axial approach of the respective half-pulleys, going from the low-gear condition (half-pulleys farther apart) to the high-gear condition (half-pulleys closer together).

Therefore, in a conventional CVT, once the physical and geometric features of the system are fixed, the transmission ratio depends on the engine RPM and the torque demanded.

There is a need to produce a CVT transmission system wherein the transmission curve may be significantly altered according to the driver's torque requirements.

In other words, there is a need to produce a CVT transmission system that, for example, in the case wherein, starting from a certain condition, the driver suddenly demands a higher or lower torque, the system adapts and satisfies such demand.

The object of the present invention is to provide a transmission device that meets the requirements mentioned above.

Such object is achieved by a transmission device made according to claim 1. The dependent claims describe variants of embodiment.

The features and advantages of the transmission device according to the invention will be apparent from the description given below, provided by way of non-limiting example, in accordance with the accompanying figures, wherein.

Figure 1:
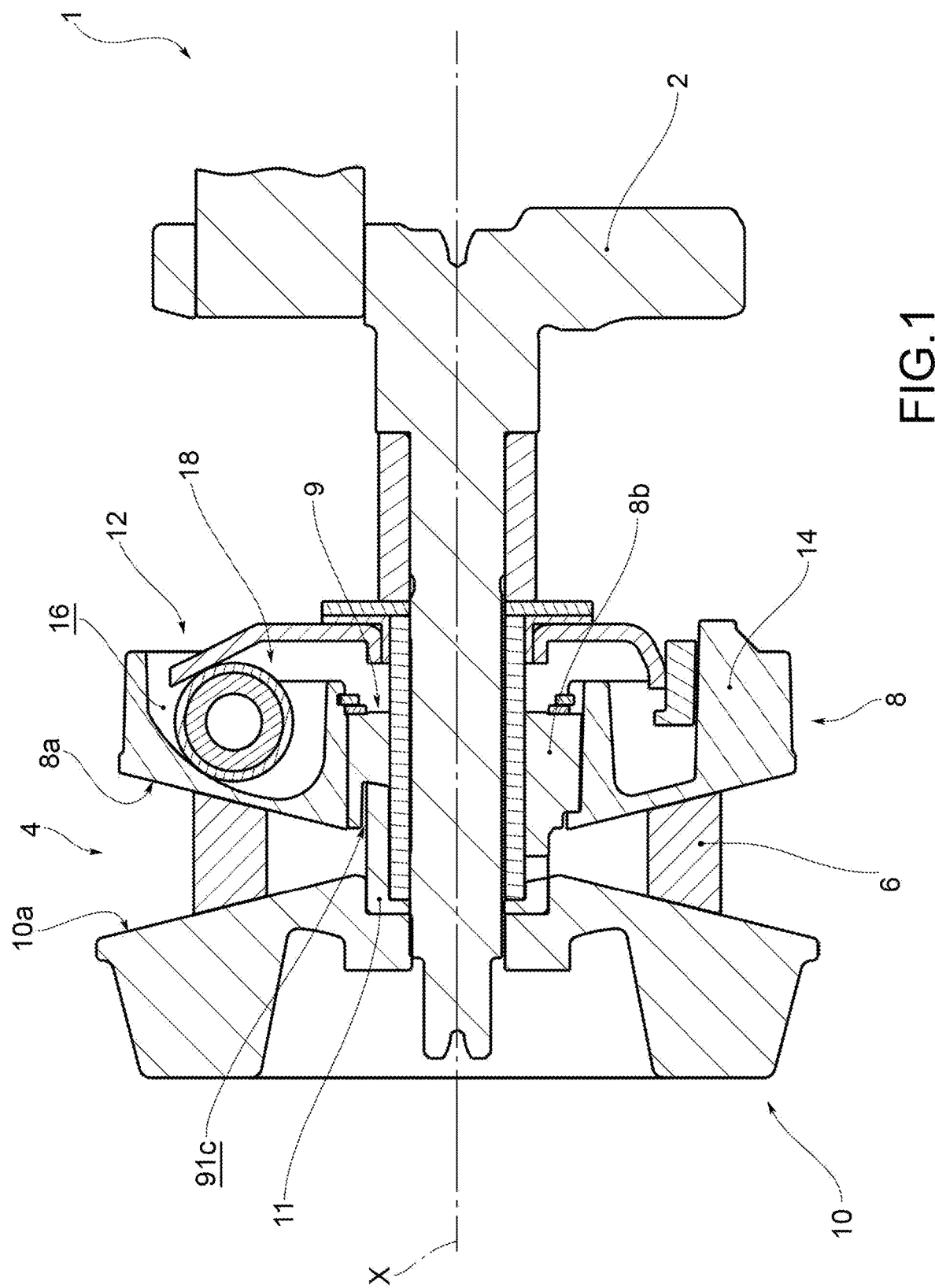
FIG. 1 shows a longitudinal section of a transmission device according to an embodiment of the present invention.
Figure 3:
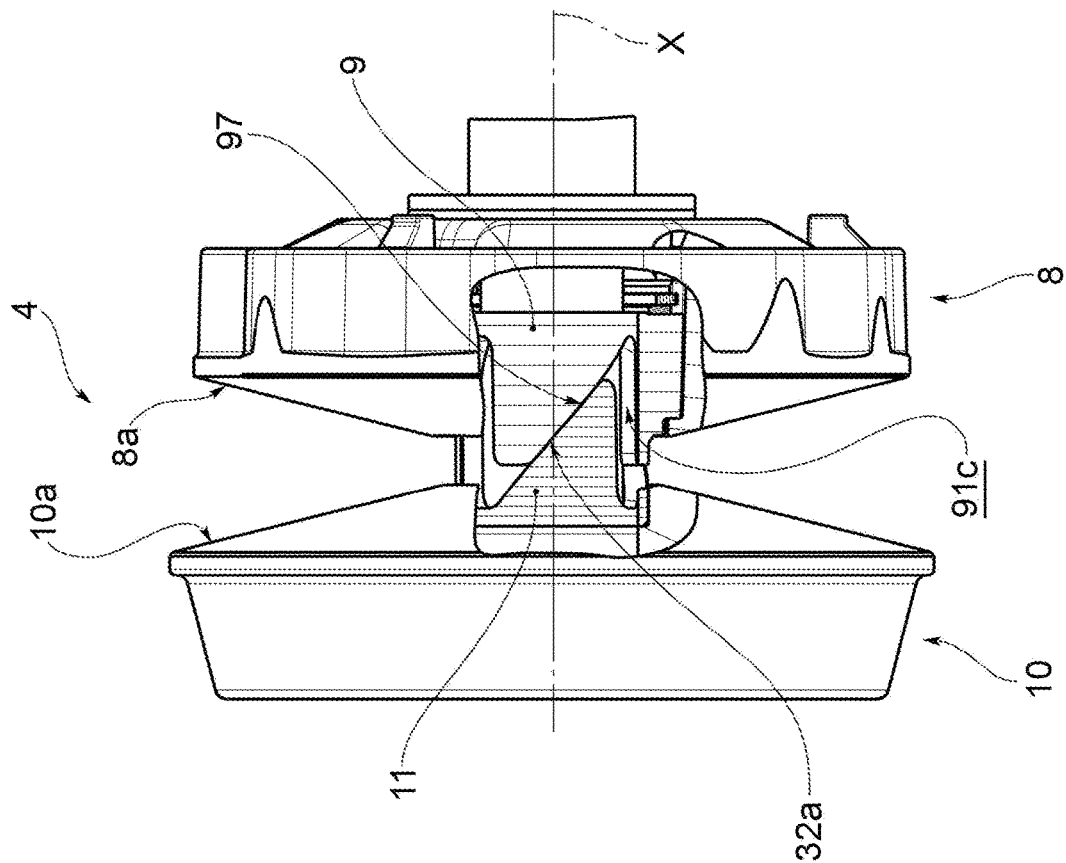
FIG. 3 shows the pulley of FIG. 2 partially in section.
Figure 2:
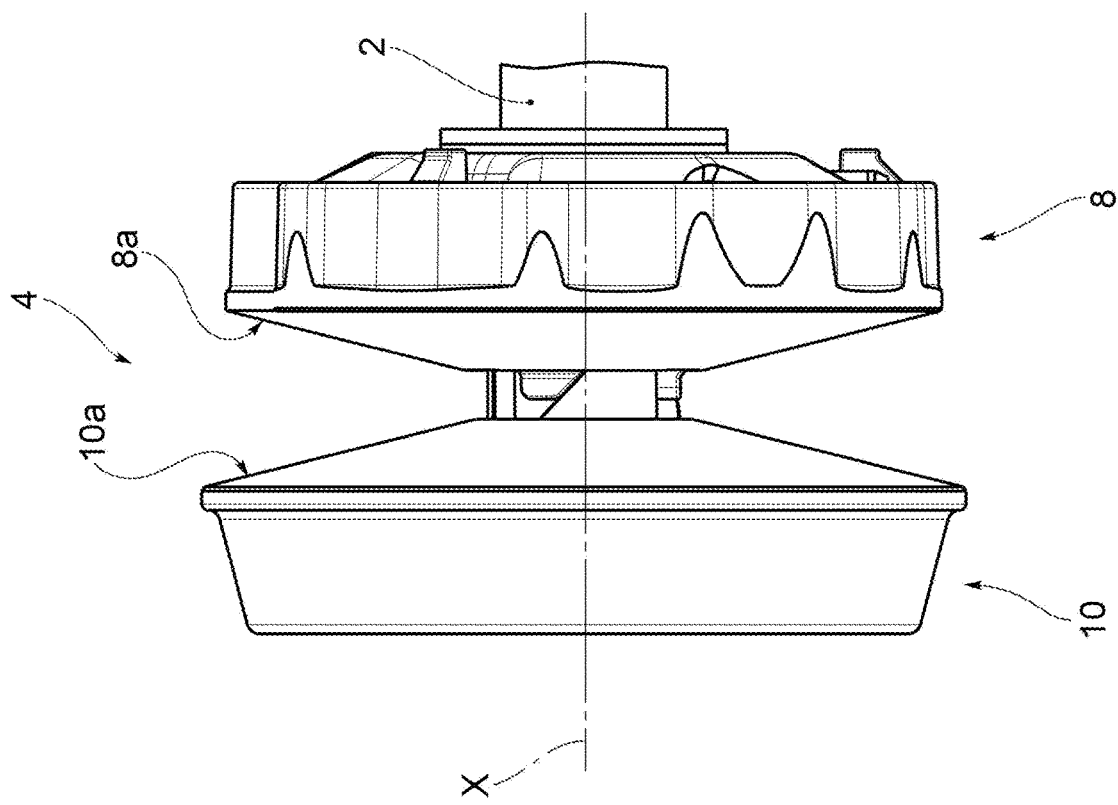
FIG. 2 is a pulley of the transmission device of FIG. 1.
Figure 4:
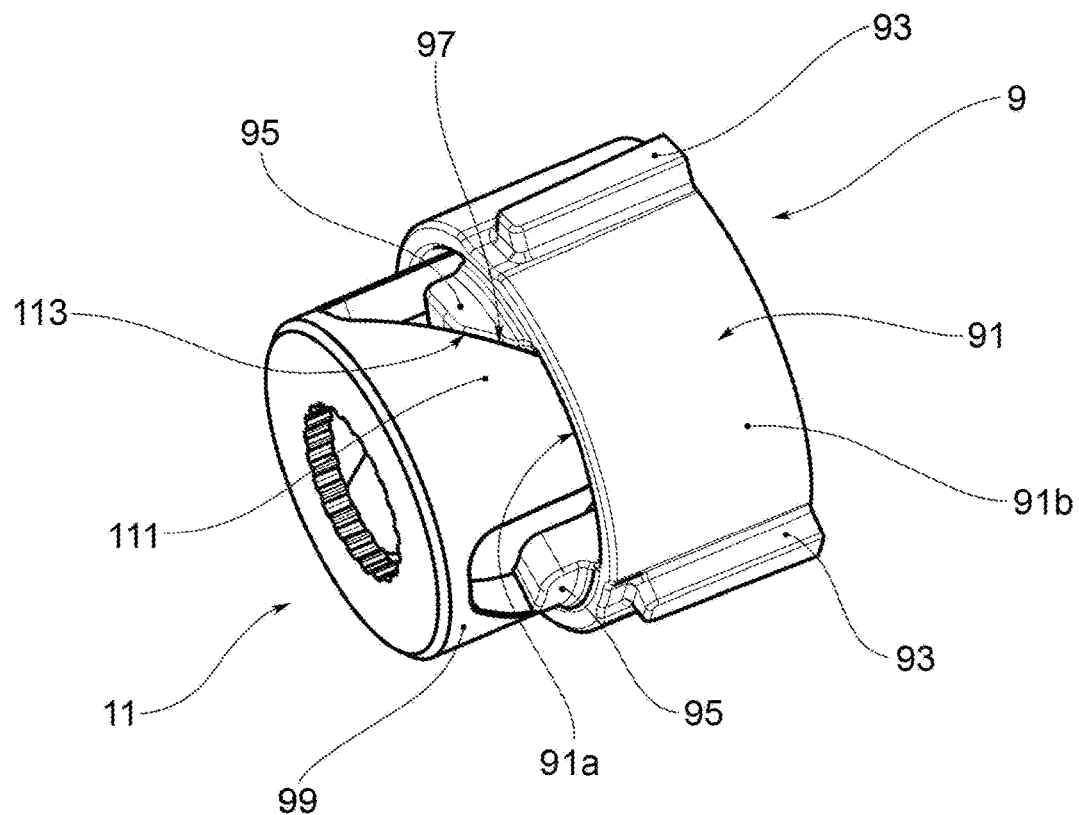
FIG. 4 is an assembly comprising a fixed bushing and a mobile bushing of the device according to the invention, in accordance with one embodiment.
Figure 5:
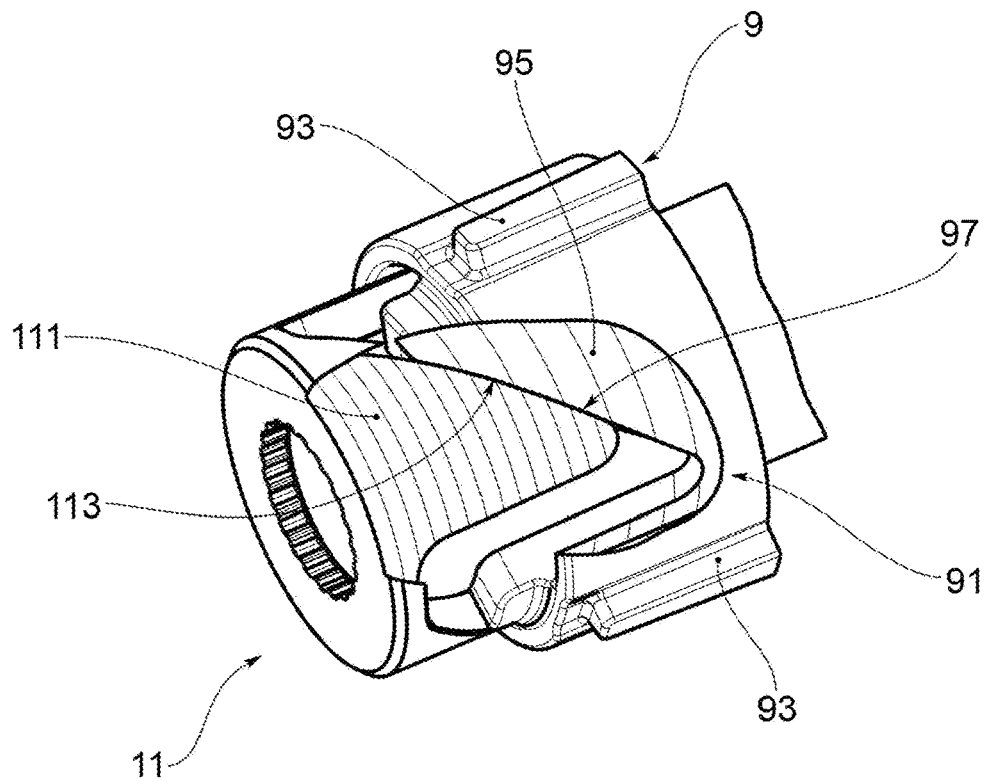
FIG. 5 shows the assembly of FIG. 4 partially in section.

With reference to the accompanying figures, a continuously variable transmission device, configured to be preferably applied to a two/three-wheel motorcycle engaged with a drive shaft 2 defining an axis of rotation X, is collectively indicated at 1.

The transmission device 1 comprises a first drive pulley 4, actuated in rotation by the drive shaft 2, and a second driven pulley (not shown), which are connected together with a V-belt 6.

The drive pulley 4 is composed of a first half-pulley 8 and a second half-pulley 10 respectively provided with facing active surfaces 8a, 10a in the shape of a truncated cone, sliding along said axis of rotation X so as to bring the active surfaces 8a, 10a closer together and farther apart, and integral with each other in rotation.

The first half-pulley 8 comprises in particular
a mobile bushing 9 that bears the active surface 8a and provides a bushing 8b coaxial to the drive shaft 2, and
a speed controller 12 comprising a container 14 supported by the mobile bushing 9 and provided with a shaped seat 16 and a plurality of rollers 18 housed in the seat 16.

The rollers produce centrifugal masses which, as the number of engine RPMs increases, push the first half-pulley 8, and in particular the mobile bushing 9, toward the second half-pulley 10.

In this way, the winding diameter of the belt 6 on the drive pulley 4 increases, and such belt, not being able to elongate, acts to decrease the winding diameter on the driven pulley, increasing the transmission ratio (high gear).

The drive pulley 4 further comprises a fixed bushing 11 extending predominantly along the axis of rotation X coaxial to the drive shaft 2 and coupled in rotation with the same, for example by means of a grooved profile, so as to maintain a fixed position thereon.

Preferably, the mobile bushing 9 comprises a main wall 91, annular with respect to the axis of rotation X, defined between a cylindrical inner surface 91a and an outer surface 91b.

Preferably, the mobile bushing 9 also comprises at least one prominence 93, protruding externally radially from the outer surface 91b, and provided with a predetermined axial extension. For example, three prominences 93 are provided, arranged equally-spaced angularly.

Said prominences 93 engage the container 14 so as to fix it to the mobile bushing 9.

In addition, the mobile bushing 9 comprises at least one driven cam portion 95, projecting radially internally from the inner surface 91a of the main wall 91; said driven cam portion 95 is shaped so as to create surfaces that define a driven cam profile 97.

For example, three driven cam portions 95 are provided, angularly spaced, so as to form compartments within which the fixed bushing 11 penetrates.

Preferably, said driven cam portions 95 project axially from the main wall 91 toward the fixed bushing 11.

The fixed bushing 11 has in turn at least one drive cam portion 111 projecting axially, suitable to penetrate the mobile bushing 9.

For example, said drive cam portion 111 has a radial dimension smaller than the radial dimension of the inner surface 91a of the main wall 91 of the mobile bushing 9 and axial extension such that it may be inserted into the compartments formed between the driven cam portions 95 of the mobile bushing 9.

In other words, the inner surface 91a delimits a housing compartment 91c and the drive cam portion 111 of the fixed bushing 11 is suitable to penetrate axially into said housing compartment 91c of the mobile bushing 9.

Said drive cam section 111 of the fixed bushing 11 is shaped so as to create surfaces defining a drive cam profile 113.

The transmission device 1 comprises therefore a cam system operating between the fixed bushing 11 and the mobile bushing 9, comprising the driven cam portions 95 and the respective driven cam profiles 97, the drive cam portions 111 and the respective drive cam profiles 113, suitable to transmit the rotation between the fixed bushing 11 and the mobile bushing 9 and configured to obstruct the active surfaces 8a, 10a from approaching each other.

In the normal operation of the transmission device 1, in case of active torque transmitted by the drive shaft if the demand for greater torque starts from a low gear, the cam system opposes the advancement of the active surface 8a of the first half-pulley 8 towards the active surface 10a of the second half-pulley 10, whereby the gear change is delayed and the behavior of the transmission device is sportier than with a standard CVT.

If, instead of the braking torque being transmitted by the drive shaft, for example in the case of a lower torque requirement from the driver who releases the gas or brakes or with a vehicle driving downhill, starting from a high gear, the cam system facilitates the separation of the active surface 8a of the first half-pulley 8 from the active surface 10a of the second half-pulley 10, thereby facilitating the passage to the low gear and hence a torque markedly lower than a standard CVT.

Innovatively, the transmission device described above allows the demand mentioned above to be satisfied, as it allows the driver's desire to have a larger or smaller torque to be fulfilled.

Also advantageously, by appropriately shaping the cam system profiles, it is possible to design a transmission device that responds more or less immediately to a demand for a larger or smaller torque.

Figure 6:
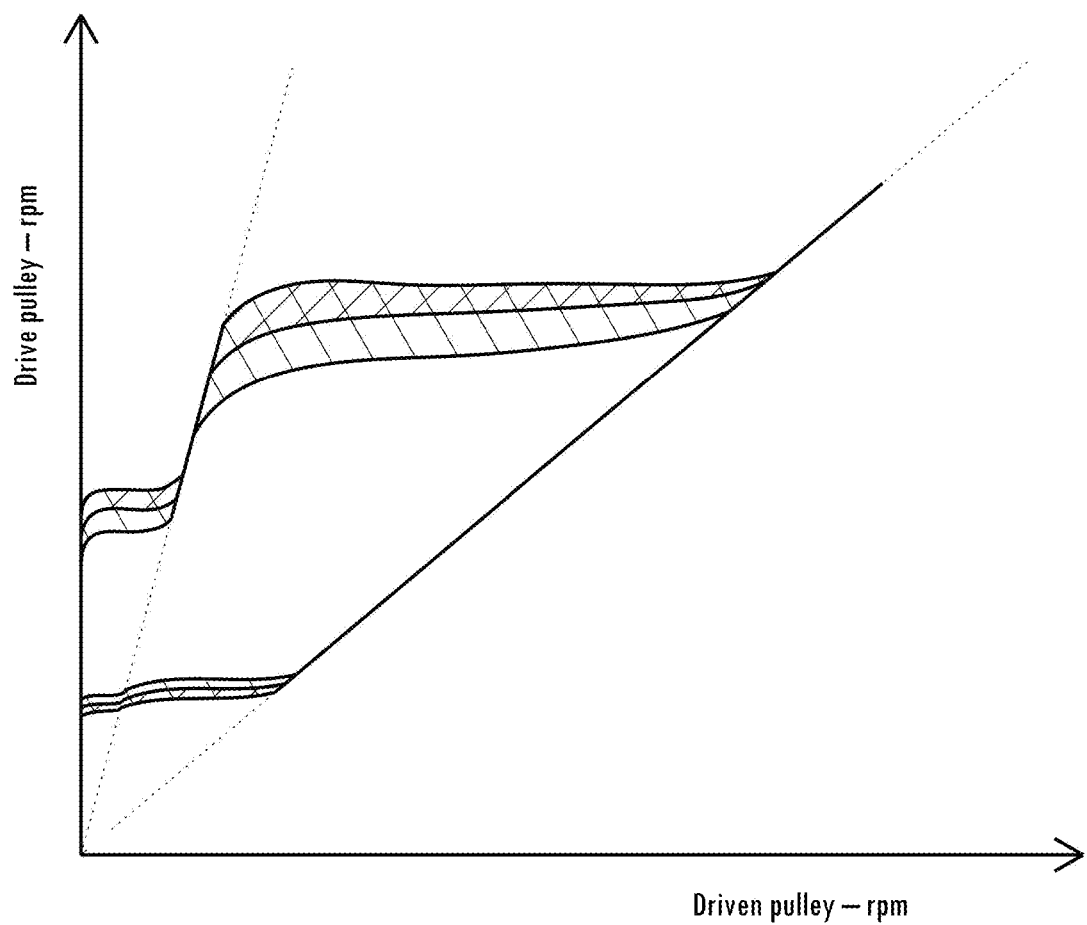
FIG. 6 shows the engine RPM of a drive pulley and of a driven pulley for a conventional CVT transmission system and for a CVT transmission system according to the present invention.
Figure 6:
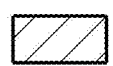
Figure 6:
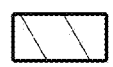

For example, FIG. 6 shows a graph with the engine RPM of a drive pulley and of a driven pulley for a conventional CVT transmission system and for a CVT transmission system according to the present invention. The latter clearly shows greater hysteresis.

In addition, the fixed bushing is radially near to the axis of rotation X so that the fixed bushing—mobile bushing system collectively has a small radial footprint. Consequently, the active surfaces 8a, 10a also extend to a radial zone near to the axis of rotation, so that the belt may be arranged on very small winding radii.

Advantageously, this allows a greater shift in gear ratios, with the same maximum pulley size.

According to a further advantageous aspect, the device according to the invention has a considerable ease of assembly.

It is clear that one skilled in the art, in order to meet specific needs, may make changes to the transmission device described above, all contained within the scope of protection defined by the accompanying claims.

The invention claimed is:

1. A continuously variable transmission device for a motorcycle with two, three, or four wheels, which can be connected to a drive shaft, comprising:
   a drive pulley provided with active surfaces for a V-belt, having a mobile bushing bearing one of the active surfaces, the mobile bushing sliding axially under the action of rollers of a speed controller to achieve a gear change between low gear and high gear;
   a fixed bushing fixable and coaxial to the drive shaft;
   a cam system operating between the fixed bushing and the mobile bushing configured for transmitting the rotation between the fixed bushing and the mobile bushing and for opposing the movement towards each other of the active surfaces, comprising at least a driven cam portion of the mobile bushing and a drive cam portion of the fixed bushing respectively having a driven cam profile and a drive cam profile;
   wherein the mobile bushing comprises a main wall, annular with respect to the axis of rotation (X), having an inner surface which delimits a housing compartment and the driven cam portion protrudes radially internally from said inner surface;
   and wherein the drive cam portion of the fixed bushing is suitable to penetrate axially in the housing compartment of the mobile bushing.

2. A continuously variable transmission device according to claim 1, wherein the mobile bushing supports a container of the speed controller.

3. A continuously variable transmission device according to claim 2, wherein the main wall supports the container (14).

4. A continuously variable transmission device according to claim 3, where the main wall has an outer surface and the mobile bushing comprises at least one axial prominence protruding radially externally from the outer surface, which engages the container to fix it to the mobile bushing.

* * * * *